Dec. 13, 1966   R. L. WILKINS   3,290,879
ROTARY ENGINE

Filed April 8, 1965   2 Sheets-Sheet 1

INVENTOR
ROBERT L. WILKINS
BY Lockwood, Woodard, Smith & Weikart
Attorneys

Dec. 13, 1966   R. L. WILKINS   3,290,879
ROTARY ENGINE

Filed April 8, 1965   2 Sheets-Sheet 2

INVENTOR.
ROBERT L. WILKINS

BY Lockwood, Woodard, Smith & Weikart
Attorneys

United States Patent Office 3,290,879
Patented Dec. 13, 1966

3,290,879
ROTARY ENGINE
Robert L. Wilkins, Indianapolis, Ind.
(2316 Bay Drive, Miami Beach, Fla.)
Filed Apr. 8, 1965, Ser. No. 446,651
7 Claims. (Cl. 60—39.39)

This invention relates generally to prime movers and more particularly to a fuel burning engine having only one primary rotating element.

An object of the present invention is to provide an engine of simple and compact construction.

A further object is to provide an engine eliminating all reciprocating motion.

A further object is to provide an engine capable of high operating speeds.

A further object is to provide an engine incorporating integral fuel and air pumping means.

Described briefly, a typical embodiment of the present invention employs a two piece case having a large cavity therein receiving a rotor and having a small cavity therein for fuel and air mixing purposes. The rotor includes air compressor blades drawing air in through an opening in the front of the case and compressing it and discharging it into the mixing chamber at high velocity. The rotor also includes turbine blades for driving the rotor, these blades being mounted near the outer periphery.

The rotor also includes fuel pumping blades therein which draw fuel in and pump it centrifugally to discharge it into the mixing chamber. The mixture is taken from the mixing chamber through passageways in the rotor shaft, through an inlet manifold in the rotor and through passageways in the pumping blades and distributed to a series of combustion chambers disposed in a circle in the case. Ignition means are employed including spark plugs in the combustion chamber and contactors mounted in the rotor for distributing high voltage pulses to the spark plugs in the proper sequence.

The turbine blades are arranged in groups on the rotor and sealing spacers are provided between the groups of blades to inhibit discharge from the combustion chambers during the feeding of mixture thereto by the mixture passageways in the pumping rotor blades.

Some of the compressed air is applied to the fuel reservoir to establish a pressure therein aiding the discharge of fuel therefrom.

The turbine exhaust passageways in the case are connected to an auxiliary turbine assembly for added power if desired.

The compressed air flow in the case serves to pick up any excessive heat from high temperature zones and provides a useful cooling function.

The full nature of the invention will be understood from the accompanying drawings and the following description and claims.

Figure 1:
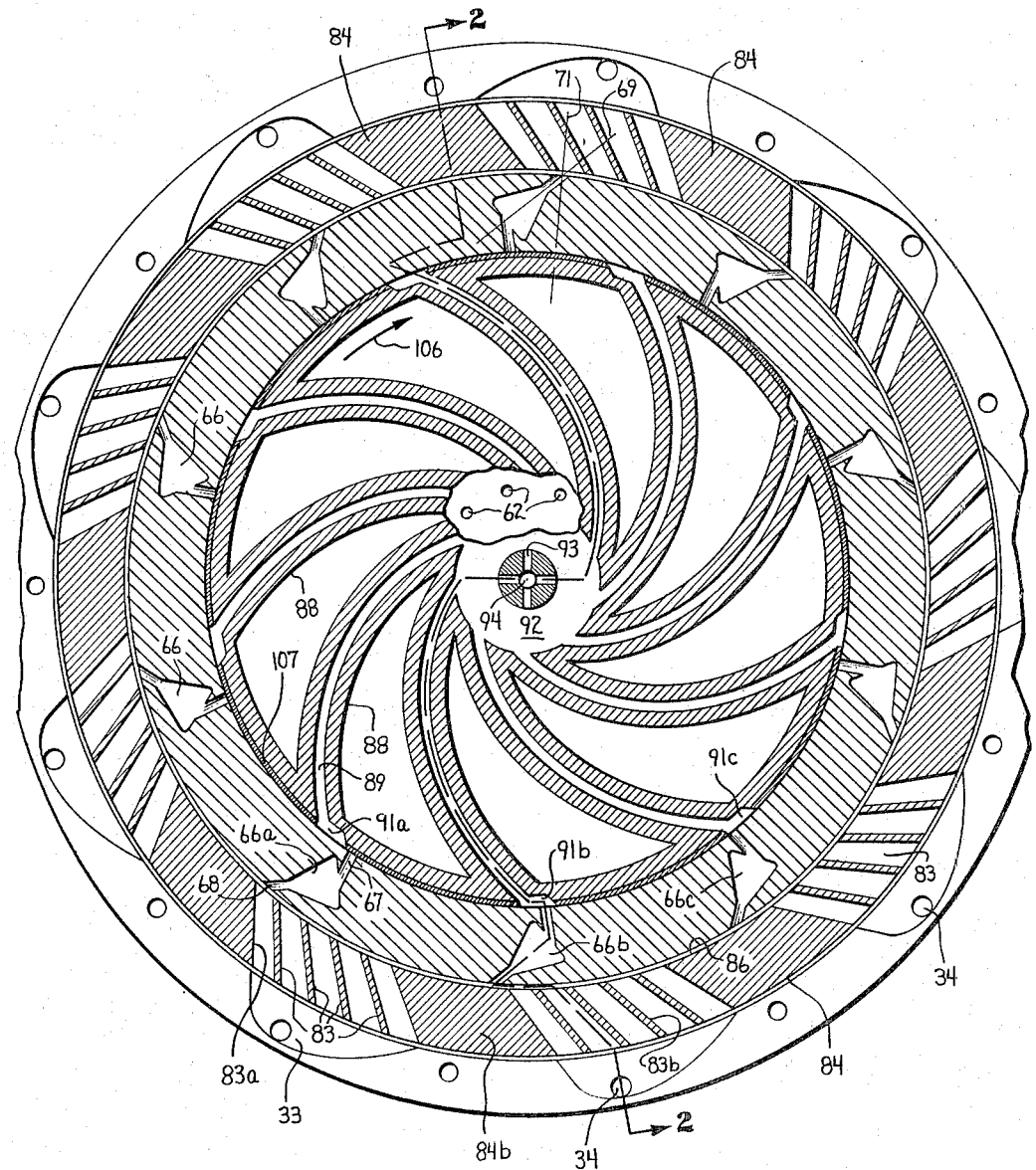
FIG. 1 is a front elevation view of a typical embodiment of the invention looking along the rotor axis, with the front cover of the case removed, part of the rotor being shown in section.
Figure 2:
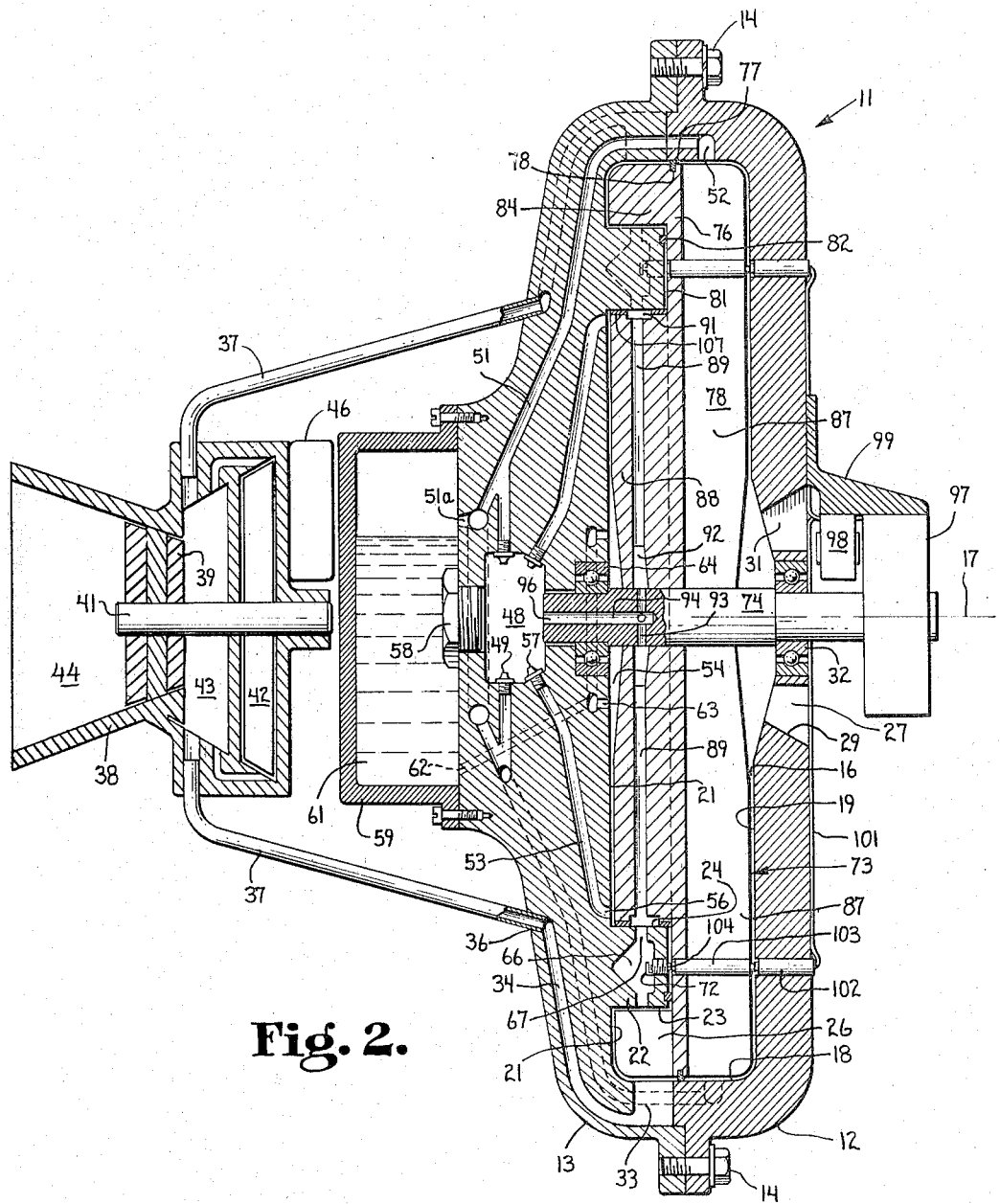
FIG. 2 is a section through the illustrated embodiment taken along the line 2—2 of FIG. 1 and viewed in the direction of the arrows.

Referring now to the drawings in detail, the case 11 includes front and rear covers 12 and 13, respectively, bolted together by a series of bolts 14 passing through the bolt flanges thereof. The case has a first cavity 16 therein with an axis 17 of symmetry. The cavity has an outer circular wall 18 which is centered on the axis 17 and it has a front wall 19 and a rear wall 21.

A combustion chamber block 22 projects forwardly from the rear wall and extends in a circle, also centered on the axis 17. The block has an outer cylindrical wall 23 spaced from and facing a portion of the wall 18 of the first cavity. It has an inner cylindrical wall 24, and this wall together with the wall 21 form a recess in the cavity. The outer portion of the wall 21 outside of the combustion chamber block, together with the cylindrical wall 23 of the block and the portion of wall 18 facing the block provide the annular recess 26 in the case.

A central opening 27 is provided in the front face of the case and is generally funnel shaped with the funnel wall 29 converging inwardly and rearwardly toward the axis 17. The case includes a set of circularly spaced spokes 31 in the opening and these spokes support a front bearing 32 on the axis 17.

The case also includes a first combustion product manifold 33 communicating with the annular recess 26 and having a first plurality of discharge passageways 34 extending therefrom. These passageways 34 discharge through the rear of the case at the regions 36 which discharge in a direction generally parallel to the axis 17. In this way, if the engine is mounted in a vehicle which moves principally in the direction of the axis 17, the discharge from the passageways 34 can be employed for thrust purposes. However in the illustrated example, piping 37 is connected to a thrust unit 38 wherein it drives a turbine 39 connected to a shaft 41. This shaft has a water pump 42 therein which pumps water into the chamber 43 where it mixes with the exhaust products to actually provide a steam and combustion product discharge through the turbine blades and the exhaust outlet 44. A water reservoir is provided at 46.

As mentioned above, the engine case includes a second cavity 48 which serves as the fuel and air mixing chamber. Air is supplied to this cavity through a set of nozzles 49 at the outlets of compressed air passageways 51 which are provided in the case and extend forwardly therein to the annular compressed air manifold 52 which opens into the cavity 16 around the circular wall 18 thereof.

The case also includes a plurality of fuel discharge passageways 53 extending from the recess 54 in the case cavity, and more specifically from inlets 56 in the rear wall 21 of the cavity and located near the inner cylindrical wall 24 of the combustion chamber block. These fuel discharge pasageways have nozzles 57 therein at the outlets thereof into the second cavity 48. A removable cap 58 can be provided at the rear end of the cavity 48 to facilitate removal of the nozzles if and when desired.

A fuel reservoir 59 is bolted to the rear end of the case and includes a supply of fuel 61 therein. Fuel supply passageways 62 from the reservoir 59 to the recess 54 are provided in the case and have outlets 63 in the rear wall 21 of the cavity, as near as possible to the axis 17. A rear bearing 64 is provided in the rear wall 21 on the axis 17.

Combustion chambers 66 are equally spaced in a circle in the combustion chamber block, and all are identical so one can be described in detail. For each combustion chamber there is a mixture admitting inlet 67 disposed in the inner cylindrical wall of the combustion chamber block, and a discharge outlet 68 in the outer cylindrical wall thereof. Each combustion chamber has somewhat of a funnel shape providing a discharge passageway extending to the outlet in a direction along the line 69 which is at an angle of between 45 and 90 degrees with respect to a radius 71 extending from the axis 17 through the outlet 68.

A spark plug 72 is provided in each combustion chamber.

The rotor 73 of the engine includes the shaft 74 mounted in the bearings 32 and 64. The rotor includes a circular divider wall 76 having an outer circular surface 77 in closely spaced relationship to the circular cavity wall 18. A first circular sliding seal 78 may be received in a groove in the divider wall and engage the circular cavity wall 18. There is thus provided an air compressor chamber 78 in the cavity 16 in front of the divider wall 76. Because the rear face 79 of the divider wall passes in closely spaced relationship to the front wall 81 of the combustion chamber block, the divider wall is effective together with the other walls forming the annular recess 26 to provide a turbine chamber. Similarly the portion of the divider wall radially inward from the combustion chamber block cooperates with the other walls forming the recess 54 to provide a fuel pumping chamber. A second circular sliding seal in the form of a ring 82 may be received in a groove in the front wall 81 of the combustion chamber block to assure that the turbine chamber is sealed off from the fuel pumping chamber.

The rotor includes a plurality of turbine blades 83 etxending rearwardly from the divider wall and arranged in circularly spaced groups around the rotor, there being spacer members 84 between each successive group of plates, the spacer members having inner cylindrical wall portions 86 in closely spaced relationship to the outer cylindrical wall 23 of the combustion chamber block.

The rotor also includes a plurality of circularly spaced radially extending compressor blades 87 projecting forwardly from the divider wall in the compressor chamber. The rotor also includes a plurality of circularly spaced, radially extending fuel pumping blades 88 received in the fuel pumping chamber, these blades extending rearwardly from the divider wall. In each of these pumping blades there is disposed a radially extending distributor passageway 89 having an outlet 91 registrable with the inlet 67 of each of the combustion chambers as the rotor turns. There is an inlet manifold portion 92 of the rotor communicating with the inlet of each of the distributor passageways 89, and this manifold also communicates with the plurality of apertures 93 of the rotor shaft 74 in which apertures open into the central axially extending pasageway 94 of the shaft, this passageway having its inlet 96 in the mixing cavity 48. If desired, pumping blades without distributor passageways can be employed in addition to those having distributor passageways therein.

At the front end of the shaft 74, electrical generator means 97 are provided together with a transformer or coil assembly 98, these being mounted to the case by the bracket 99. A high voltage output conductor 101 is provided and extends through the front of the case at as many spaced points around the case as there are combustion chambers inside the case. The high voltage conductor is, of course insulated from the case. Output contactors 102 are provided at the inner face 19 of the front wall of the case and these are engageable by distributor conductors 103 embedded in certain of the compressor blades and insulated therefrom. Each spark plug 72 also has a contactor 104 projecting forwardly from the front wall of the combustion chamber block. One of the spark plug contactors 104 and one of the contactors 102 are simultaneously engageable by the ends of the distributor conductors 103 to energize the corresponding spark plug. A ground circuit path may be completed through the case and the bracket back to the coil or transformer 98.

In the illustrated embodiment, it is observed that there are ten combustion chambers and nine distributor passageways and nine groups of turbine blades. The reason for having more combustion chambers than an integral multiple of the number of distributor passageways and turbine blade groups is so that a smooth succession of power pulses around the engine can be obtained.

*Operation*

In the operation of the present invention, consider that the generator 97 has an electric starter motor connected thereto, or is of the type which can be employed as the starter also so as to initiate rotation of the rotor. As the rotor rotates, air drawn in through the front opening is compressed by the compressor blades through the passageways 51 and discharged into the cavity 48. A portion of this air is bled through the passageway extension 51a into the fuel reservoir to establish a pressure over the fuel therein. Thus some of the fuel is urged out of the reservoir through the supply passageway 62 into the pumping chamber.

As the rotor turns, the fuel entering the pumping chamber is thrown outwardly and forced through the fuel discharge passageways 53 and atomized by the nozzles 57 and discharged thereby into the mixing cavity or chamber 48. There a combustible fuel-air mixture is attained which is forced out, due to the combined pressure of air and fuel, through the passageway 96 in the shaft and out through the passageway 89. As shown in the diagram in FIG. 1 particularly, most of the outlets of these passageways are closed as the result of the fact that their outlets are blocked by the inner cylindrical surface or wall 24 of the combustion chamber block. However the outlets of some of these passageways such as 91b and 91c are in registry with inlets to two of the combustion chambers. Previously the outlet 91a was in registry with the inlet to combustion chamber 66a. This occurs as the rotor rotates in the direction of the arrow 106. The turbine group spacer members are arranged such that during the time that the combustion chambers are being charged with mixture, the outlet thereof is closed by the spacer such as spacer 84b, for example closing the outlet of combustion chamber 66b. Thus the pressure established by the centrifugal force developed in the distributor passageways is applied to the mixture in the chambers 66b while they are being charged with mixture.

As the distributor passageway outlet 91a passes the inlet to the combustion chamber 66a, the conductor 103 makes contact with the contactors 102 and 104 for the spark plug for combustion chamber 66a whereupon ignition occurs. Immediately thereafter, the first of the turbine blades 83a registers with the outlet and, because the turbine blade is disposed at an angle with the direction of discharge of the combustion chamber, an impulse is applied to the turbine blade. The gas discharge from the turbine blades then enters the outlet manifold 33 and is discharged through one or more of the passageways 34. Accordingly the rotor is driven in the direction of the arrow 106. The next subsequent combustion chamber to be fired is chamber 66b and then chamber 66c and so on around the combustion chamber block. The distributor conductors in the rotor compressor blades are arranged to obtain ignition in the various combustion chambers at the proper times.

If it is desired to do so, to minimize leakage in the space between the inner cylindrical wall of the combustion chamber block and the outer ends of the fuel distributor passageways, an axially extending circular rim 107 can be employed between the various fuel pumping blades 88 and have an outer cylindrical surface machined for a sealing fit with the inner cylindrical wall of the combustion chamber block.

In the illustrated embodiment of the invention, there are ten combustion chambers and nine groups of turbine vanes and distributor passageways. Accordingly this embodiment would produce 90 explosions per revolution. Because the gases are exploded near the periphery of the rotor, a high torque is obtained. Also, because of the location of the combustion chambers near the periphery of the rotor, a high mixture pressure can be obtained by the distributor passageways in the rotor. With the outlet of the passageways elongated to extend for a portion of the length or circumference of the rotor, ample quantity of mixture is ready for injection into the combustion chamber upon registry, even though the speed of the rotor is high. At 65,000 revolutions per minute, the illustrated embodiment of the invention would develop 5,850,000 explosions or power impulses per minute. This high frequency may result in a silent engine.

The circular length of each group of turbine blades is adequate to relieve the pressure in the combustion chamber so that there is low resistance therein to injection of a further charge of fuel-air mixture upon registry of the next succeeding distributor passageway therewith. As the speed increases, the centrifugal force feeding the mixture to the combustion chambers increases to promote the injection of an adequate charge of mixture into each combustion chamber even at high speeds.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In a rotary engine, the combination comprising:
a case having a first cavity therein and having an axis,
said case having an air inlet opening therein,
combustion chamber means in said case;
a rotor mounted for rotation in said case on said axis,
said rotor having means thereon disposed in said first cavity of said case and revolving about said axis and pumping fuel,
said fuel pumping means of said rotor including a plurality of fuel pumping blades beginning near said axis in said cavity and extending radially outward to receive fuel from fuel supply means and pump it outward in said cavity for mixture with compressed air,
said rotor including mixture distributor passageways therein having inlets near said axis and outlets remote from said axis and registrable with inlet means for said combustion chamber means as said rotor rotates on said axis in said case.

2. In a rotary engine, the combination comprising:
a case having a first cavity therein and having an axis,
said case having an air inlet opening therein,
combustion chamber means in said case;
a rotor mounted for rotation in said case on said axis,
said rotor including turbine blade means disposed to receive combustion products discharged from said combustion chamber means to drive said rotor in rotation on said axis,
said rotor having means in said first cavity forming a fuel pumping chamber, and forming an air compressor chamber,
said rotor including a plurality of compressor blades in said compressor chamber to draw air in through said opening and compress it,
said rotor including a plurality of fuel pumping blades beginning near said axis and extending radially outward within said fuel pumping chamber to receive fuel from fuel supply means and pump it radially outward through said pumping chamber for mixture with compressed air beginning near said axis,
said rotor including mixture distributor passageways therein having inlets near said axis and outlets remote from said axis and registrable with inlet means for said combustion chamber means as said rotor rotates on said axis in said case.

3. In a rotary engine, the combination comprising:
a case having a first cavity therein and having an axis,
said case having an air inlet opening therein,
combustion chamber means in said case;
a rotor mounted for rotation in said case on said axis,
said rotor and said case having means in said first cavity forming a turbine chamber and forming a fuel pumping chamber and forming an air compressor chamber,
said rotor including a plurality of turbine blades in said turbine chamber and arranged to receive combustion products discharged from said combustion chamber means,
said rotor including a plurality of compressor blades in said compressor chamber to draw air in through said opening and compress it,
said rotor including a plurality of fuel pumping blades in said fuel pumping chamber, to receive fuel from fuel supply means and pump it out of said pumping chamber for mixture with the compressed air,
said rotor including mixture distributor passageways therein having inlets near said axis and outlets remote from said axis and registrable with inlet means for said combustion chamber means as said rotor rotates on said axis in said case.

4. A rotary engine comprising:
a case having a first cavity therein and having an axis,
said case having an air inlet opening therein,
said case having a second cavity therein for mixing fuel and air therein,
said case having compressed air passageway means therein extending from a portion of said first cavity to said second cavity,
said case having fuel discharge passageway means therein extending from a portion of said first cavity to said second cavity,
a source of fuel,
fuel supply passageway means in said case and extending from said source to said first cavity;
a plurality of combustion chambers in said case and spaced in a circle, each combustion chamber having a mixture inlet in said first cavity and an outlet in said first cavity;
igniter means in each combustion chamber;
a rotor mounted for rotation in said case on said axis,
said rotor having central passageway means therein with an inlet opening in said second cavity to receive a fuel-air mixture therefrom,
said rotor and said case having means in said first cavity to form a turbine chamber and to form a fuel pumping chamber and to form an air compressor chamber,
said rotor including a plurality of turbine blades in said turbine chamber and arranged to receive combustion products discharged from said combustion chambers through the outlets thereof whereby said turbine blades are driven in a circular path,
said rotor including a plurality of compressor blades in said compressor chamber to draw air in through said opening and compress it into said compressed air passageway means,
said rotor including a plurality of fuel pumping blades in said fuel pumping chamber to receive fuel from the fuel supply passageway means and pump it out of said pumping chamber and into said fuel discharge passageway means to inject fuel therefrom into said second cavity for mixture with the air therein,
said rotor including mixture distributor passageways therein having inlets communicating with the said central passageway and having outlets registrable with said combustion chamber inlets as said rotor rotates on said axis in said case,
means providing a sequence of mixture ignitions in said combustion chambers progressively around said circle of combustion chambers,
and wall means in said rotor between certain of said turbine blades;
the said combustion chamber inlets and outlets being related to said distributor passageway outlets and to said wall means between said certain blades such that said combustion chamber outlets are closed during registry of said distributor passageway outlets with said combustion chamber inlets.

5. A rotary engine comprising:

a case having a first cavity therein and having an axis, said case having an air inlet opening therein, said case having a second cavity therein for mixing fuel and air therein, said case having compressed air passageway means therein extending from a portion of said first cavity to said second cavity, said case having fuel discharge passageway means therein extending from a portion of said first cavity to said second cavity, and said fuel discharge passageway means having nozzles therein at said second cavity;

a source of fuel;

fuel supply passageway means in said case and extending from said source to said first cavity;

a plurality of combustion chambers in said case and spaced in a circle, each combustion chamber having a mixture inlet in said first cavity and an outlet in said first cavity, each combustion chamber having means therein for discharging from said outlet in a direction intersecting a radius from said axis to the said outlet;

igniter means in each combustion chamber;

a rotor mounted for rotation in said case on said axis, said rotor having an axially extending passageway therein with an inlet opening in said second cavity to receive a fuel-air mixture therefrom, said rotor and said case having means in said first cavity, forming a turbine chamber and forming a fuel pumping chamber and forming an air compressor chamber, said rotor including a plurality of turbine blades disposed in said turbine chamber and arranged to receive combustion products discharged from said combustion chambers through the outlets thereof whereby said turbine blades are driven in a circular path, and said rotor including an arcuate spacer wall between each group of turbine blades and the next group of turbine blades in the circle of groups, said rotor including a plurality of compressor blades in said compressor chamber, to draw air in through said opening and compress it into said compressed air passageway means, said rotor including a plurality of fuel pumping blades in said fuel pumping chamber to receive fuel from the fuel supply passageway means and pump it out of said pumping chamber and into said fuel discharge passageway means to inject fuel therefrom into said second cavity, for mixture with the air therein, said rotor including mixture distributor passageways therein, having inlets communicating with the axially extending passageway in said rotor and each distributor passageway having an outlet registrable with said combustion chamber inlets as said rotor rotates on said axis in said case, a source of electrical energy having a high voltage output conductor, distributor conductor means mounted to said rotor and sequentially cooperable with said output conductor and one of said igniter means as said rotor turns, spacing of said distributor conductors and distributors passageways providing a sequence of mixture ignitions in said combustion chambers progressively around said circle of combustion chambers, the said combustion chamber inlets and outlets being related to said distributor passageway outlets and the spacer walls between said blade groups such that said combustion chamber outlets are closed by spacer walls during registry of said distributor passageway outlets with said combustion chamber inlets.

6. A rotary engine comprising:

a case having a first cavity therein and having an axis, said case having an opening in the front face thereof, said case having a second cavity therein behind said first cavity for mixing fuel and air therein, said case having a plurality of compressed air passageways therein extending from a portion of said first cavity to said second cavity and having nozzles therein at said second cavity, said case having a plurality of fuel discharge passageways therein extending from a portion of said first cavity to said second cavity, and said fuel discharge passageways having nozzles therein at said second cavity;

a source of fuel;

a plurality of fuel supply passageways in said case and extending from said source to said first cavity;

a plurality of combustion chambers in said case and equally spaced in a circle, each combustion chamber having a mixture inlet in said first cavity and an outlet in said first cavity, each combustion chamber having means therein for discharging from said outlet in a direction intersecting a radius from said axis to the said outlet;

igniter means in each combustion chamber;

a rotor, said rotor having a shaft mounted for rotation in said case on said axis, said shaft having an axially extending passageway therein with an inlet opening in said second cavity to receive a fuel-air mixture therefrom, said rotor including a circular divider wall extending from said shaft radially outward to a wall of said first cavity, with first circular sliding seal means disposed between said cavity wall and said divider wall at the outer periphery of said divider wall, and second circular sliding seal means between a rear face of said divider wall and a rear wall portion of said first cavity, to form a turbine chamber and to form a fuel pumping chamber and to form an air compressor chamber, said rotor including a plurality of turbine blades disposed in said turbine chamber and arranged in circularly spaced groups secured to the rear face of said divider wall and projecting rearwardly therefrom, said blades extending generally radially to receive combustion products discharged from said combustion chambers through the outlets thereof whereby said turbine blades are driven in a circular path, and said rotor including an arcuate spacer wall between each group of turbine blades and the next group of turbine blades in the circle of groups, said rotor including a plurality of compressor blades in said compressor chamber, said compressor blades being secured to the front face of said divider wall and extending radially outward to draw air in through said opening and compress it into said compressed air passageways, said rotor including a plurality of fuel pumping blades in said fuel pumping chamber, said pumping blades being secured to the rear face of said divider wall and extending radially outward to receive fuel from the fuel supply passageways and pump it out of said pumping chamber and into said fuel discharge passageways to inject fuel therefrom into said second cavity for vaporization thereof and mixture with the air therein, certain of said pumping blades including mixture distributor passageways therein, each distributor passageway having an inlet communicating with the passageway in said shaft and each distributor passageway having an outlet registrable with said combustion chamber inlets as said rotor rotates on said axis in said case, electrical energy generator means connected to said shaft and having a high voltage output conductor extending through said case and having output contactors projecting rearwardly through a wall of said compressor chamber, an igniter means contactor extending forwardly from each igniter means, a plurality of distributor conductors mounted to said rotor and extending therethrough, each distributor conductor being simultaneously engageable with one of said output contactors and one of said igniter means contactors, spacing of said distributor conductors and distributor passageways providing a sequence of mixture ignitions in said combustion chambers progressively around said circle of combustion chambers, the number of combustion chambers being different from an integral multiple of the number of distributor passageways, the said combustion chamber inlets and outlets being related to said distributor passageway outlets and the spacer walls between said blade groups such that said combustion chamber outlets are closed by spacer walls during registry of said distributor passageway outlets with said combustion chamber inlets.

7. A rotary engine comprising:

a case having a first cavity therein said cavity being symmetrical with respect to an axis and having an outer circular wall therein, said cavity having a front wall and a rear wall with a combustion chamber block projecting forwardly from said rear wall, said block extending in a circle centered on said axis, said block having an outer cylindrical wall spaced from and facing the said circular wall of said cavity and thereby forming a first annular recess in said cavity for housing turbine blades, said block having an inner cylindrical wall cooperating with a central portion of said rear wall to form a second recess in said cavity for housing mixture pumping blades, said block being horizontally spaced from the front wall to permit passage of compressor blades therebetween, said case having a central opening in the front face thereof, said opening being generally funnel shaped and converging toward said axis, said opening being centered on said axis, and said case having a set of circularly spaced spokes bridging said opening and supporting a front bearing in the center of said opening, said case having a first combustion product manifold therein communicating with said first recess through openings in said circular wall, said case having a second cavity therein behind said first cavity for mixing fuel and air therein, said case having a first plurality of passageways therein extending from said manifold and discharging through the rear face of said case in a direction generally parallel to said axis, said case having a second manifold encircling said first cavity and communicating with said first cavity through openings in said circular wall, said case having a second plurality of passageways therein extending from said second manifold to said second cavity and having nozzles therein at said second cavity, said case having a third plurality of passageways therein extending from said second recess to said second cavity, the inlets to the passageways of said third plurality being in the rear wall of said first cavity near said inner cylindrical wall, and said passageways of said third plurality having nozzles therein at said second cavity, a fuel reservoir having fuel therein and having air in a portion thereof, some passageways of said second pluarlity communicating with the air containing portion of said reservoir;

a fourth plurality of passageways in said case and extending from said reservoir to said second recess, the outlets of said passageways of said fourth plurality being in the rear wall of said first cavity near said axis;

a plurality of combustion chambers in said block and equally spaced in a circle, each combustion chamber having a mixture inlet in said inner cylindrical wall and an outlet in said outer cylindrical wall, each combustion chamber having a short funnel-like discharge passageway extending to its outlet in a direction at an angle of between 45 and 90 degrees from a radius from said axis to the said outlet;

a spark plug in each combustion chamber;

a rear bearing mounted in said case between said first and second cavities and centered on said axis;

a rotor, said rotor having a shaft mounted in said bearings, said shaft having an axially extending passageway therein with an inlet opening in said second cavity to receive a fuel-air mixture therefrom, said rotor including a circular divider wall extending from said shaft radially outward to the said circular wall of said first cavity, with first circular sliding seal means between said cavity wall and said divider wall at the outer periphery of said divider wall, said divider wall passing immediately in front of said combustion chamber block, with second circular sliding seal means between said block and said divider wall, whereby said first recess is closed to form a turbine chamber and said second recess is closed to form a fuel pumping chamber and the portion of said cavity in front of said recesses is closed to form an air compressor chamber, said rotor including a plurality of turbine blades in said turbine chamber and arranged in circularly spaced groups secured to the rear face of said divider wall and projecting rearwardly therefrom, said blades extending generally radially to receive combustion products discharged from said combustion chambers through the outlets thereof whereby said turbine blades are driven in a circular path, and said rotor having a plurality of intergroup arcuate spacer walls, each spacer wall being disposed between one group of turbine blades and the next subsequent group, said rotor including a plurality of compressor blades in said compressor chamber, said compressor blades being secured to the front face of said divider wall and extending radially outward to draw air in through said central opening and compress it into said second manifold whereby compressed air is supplied through passageways of said second plurality to said reservoir to pressurize the fuel therein and to said second cavity to mix with and vaporize fuel therein, said rotor including a plurality of fuel pumping blades in said fuel pumping chamber, said pumping blades being secured to the rear face of said divider wall and extending radially outward to receive fuel from the passageways of said fourth plurality and pump it out of said pumping chamber and into the passageways of said third plurality to inject fuel therefrom into said second cavity for vaporization thereof and mixture with the air therein, certain of said pumping blades including mixture distributor passageways therein, each distributor passageway having an inlet communicating with the passageway in said shaft and each distributor passageway having an outlet registrable with said combustion chamber inlets as said rotor rotates on said axis in said case, electrical energy generator means connected to said shaft and having a high voltage output conductor extending through said case and having output contactors projecting rearwardly through the front wall of said compressor chamber, a spark plug contactor extending forwardly from each spark plug and projecting through the front face of said combustion chamber block, a plurality of distributor conductors mounted to said rotor and extending therethrough, each distributor conductor being simultaneously engageable with one of said output contactors and one of said spark plug contactors, spacing of said distributor conductors and distributor passageways providing a sequence of mixture ignitions in said combustion chambers progressively around said circle of combustion chambers, the number of combustion chambers being different from an integral multiple of the number of distributor passageways, the said combustion chamber inlets and outlets being related to said distributor passageway outlets and the inter-group spacer wall between said blades such that said combustion chamber outlets are closed by said spacer walls during registry of said distributor passageway outlets with said combustion chamber inlets.

References Cited by the Examiner

UNITED STATES PATENTS 910,665   1/1909   Griepe _____ 60—39.38

MARK NEWMAN, *Primary Examiner.*

RALPH D. BLAKESLEE, *Examiner.*